Figure 1:
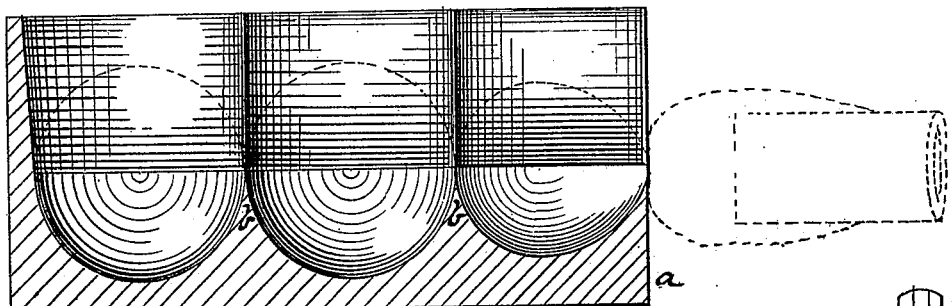

4 Sheets—Sheet 1.

T. B. ATTERBURY.
Manufacture of Glassware.

No. 205,781.      Patented July 9, 1878.

Witnesses:
J. K. Smith
L. C. Fitler

Inventor
Thos. B. Atterbury
By Attorneys
Bakewell & Kerr

T. B. ATTERBURY.
Manufacture of Glassware.
No. 205,781. Patented July 9, 1878.
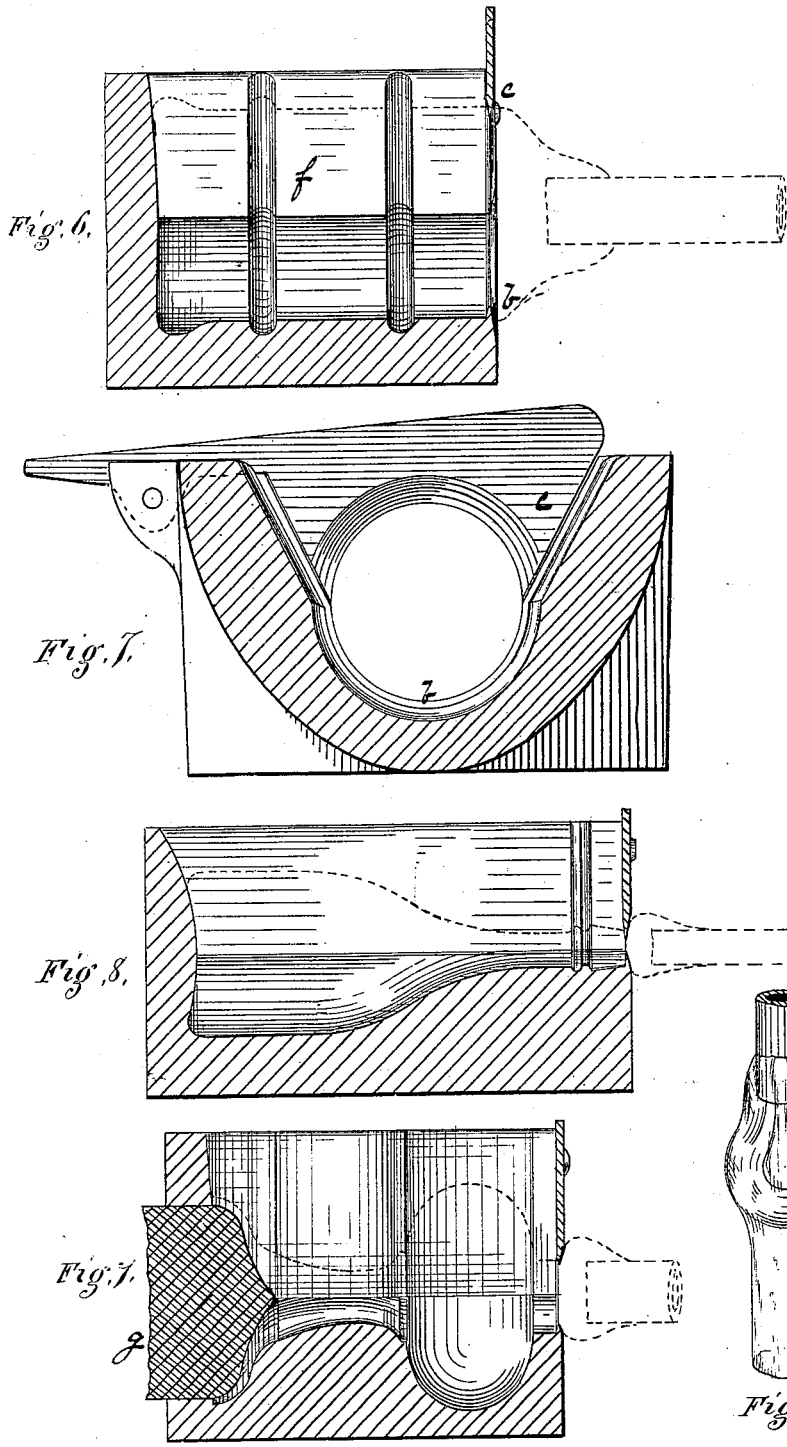

4 Sheets—Sheet 3.

T. B. ATTERBURY.
Manufacture of Glassware.

No. 205,781. Patented July 9, 1878.

Witnesses
J. K. Smith
L. C. Fitler.

Inventor Thos. B. Atterbury
By Attorneys Bakewell & Kerr

4 Sheets—Sheet 4.

T. B. ATTERBURY.
Manufacture of Glassware.

No. 205,781.  Patented July 9, 1878.

Witnesses
J K Smith
L. C. Fitler

Inventor Thos B Atterbury
By Attorneys Bakewell & Kerr

UNITED STATES PATENT OFFICE.

THOMAS B. ATTERBURY, OF PITTSBURG, PENNSYLVANIA.

IMPROVEMENT IN MANUFACTURE OF GLASSWARE.

Specification forming part of Letters Patent No. 205,781, dated July 9, 1878; application filed July 1, 1878.

*To all whom it may concern:*

Be it known that I, THOMAS B. ATTERBURY, of Pittsburg, in the county of Allegheny and State of Pennsylvania, have invented a new and useful Improvement in the Manufacture of Glassware; and I do hereby declare the following to be a full, clear, and exact description thereof.

It has heretofore been customary to form articles of glassware in molds which entirely surrounded and gave shape to the article, or by hand methods, in which the molten or plastic glass was manipulated by tools until it was brought to the required form and sufficiently chilled to retain such form. In the molding operation economy of manufacture and uniformity of result or product were secured at the expense of fineness of finish. In the hand method fineness and perfection of finish was secured, but at greater cost, and with the loss of uniformity of product. In the production of some articles both of these operations have entered; but in no case has perfection of finish, uniformity of result, and avoidance of expensive skilled labor been obtained in the production of any general line of glassware. This I accomplish by my invention, and thereby unite all of the advantages of both systems, and avoid all of the disadvantages of each.

My invention is most nearly related to the method of making glass articles by blowing the same in a surrounding mold, and yet differs essentially therefrom. This is the common method of making lamps, lamp-chimneys, and similar articles of irregular internal shape and narrow mouths. The articles, however, which are made in this way show seams or joint-marks along the sides where the parts of the mold come together, and also, frequently, blurs or defects produced by the presence of air which has become confined in the mold by the glass. In the production of fine and intricate patterns upon the surface of the article, these air-bubbles in the mold are very injurious, as they form an elastic cushion, which bars the glass from the side of the mold and prevents the imprinting of the mold-pattern thereupon.

Molds are now made, in some cases, with minute holes through the sides to permit the escape of the air from deep recesses and corners where it would be liable to be confined. In some cases the article made by blowing in a surrounding mold, when of a perfectly plain pattern, is finished and the mold marks or seams removed by rotating it therein. The article is, and of necessity must be, in a vertical position while being rotated, and the rotation must be made with great care and precision, to prevent unequal friction on the walls of the mold, which would result in the distortion or misshaping of the article. In addition to this, the article must not be expanded too much in the mold, as that would cause a binding friction on it and prevent its revolution. On some articles thus made there is a blow-over or ragged fin of glass at the open end, and this must be removed subsequently by cutting and grinding from articles which, like lamp-chimneys and fruit-jars, must preserve the exact shape of the mold, in order to fit uniform sizes of burners and caps, and by cutting and fire-finishing from articles, such as vases and bottles, which are not required to be exactly uniform in shape. Articles blown in a mold have closed lower ends, and in some cases these ends have to be opened and finished. Recently molds with cutters inserted therein, for the purpose of cutting off these ends, have been made; but their practical utility is limited, for the reason that the cutters cannot be brought into action until the glass has been blown out to and received its shape from the sides of the mold, as otherwise it would be blown around the cutter in the same manner as it would be around any other projection or any figure in the mold, retaining the same thickness of side at that as in other parts. When the cutter is projected in upon the article to cut it, the latter must be both perfectly formed and yet loose enough in the mold to permit the mold to rotate, so as to carry the cutter around and cause it to act upon the article.

I relate these various practices in this connection because they serve to bring out more clearly the novelty and utility of my invention, since, in addition to its many other advantages, it overcomes in the production of the same articles the various difficulties mentioned.

An essential feature of the articles produced by my improved method is, that although they may be either solid or hollow and of various shapes in longitudinal section, they are always perfectly round in cross-section, wherever in their length that section may be taken.

My invention consists, broadly, in forming and finishing glass articles which are round in cross-section by rotating the plastic glass in a substantially horizontal position in a segmental trough or former, so that the weight of the metal assists in the forming thereof.

When a hollow article is to be made, the glass is expanded by blowing while being rotated in the former or trough.

My invention also includes the construction of the trough or former, the forming-face of which in cross-section is a semicircle, or a segment of the same, and conforms in the curve of its outline to the article to be made therein. It is provided with one or more cutters, which sever the article at the desired point and finish the severed ends.

I have illustrated my invention in the drawings, which show a number of examples of its use.

Figures 2, 4:
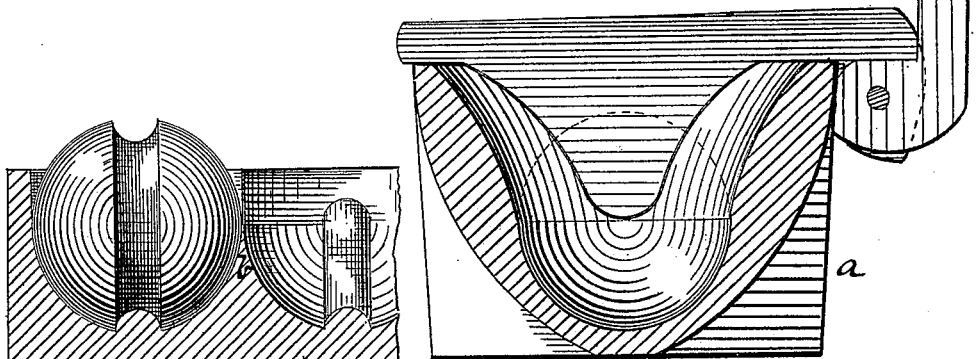

A simple example is made in Figures 1 and 2, which are, respectively, longitudinal and cross sections of a former for making glass balls.

The molten glass is gathered on the pipe and formed into an initial roll of the required length by swinging the pipe and "marvening" or rolling the glass on a plate or stone in the usual way. It is then placed on the former $a$ in a horizontal position, and rotates by turning the pipe. The former $a$ shows three cavities, each of which forms a ball, and between them sharp projections or cutters $b$. When the glass is rotated in the former upon the cutters $b$, it is gradually separated thereby and conformed to the shape of the cavities.

Figure 3:
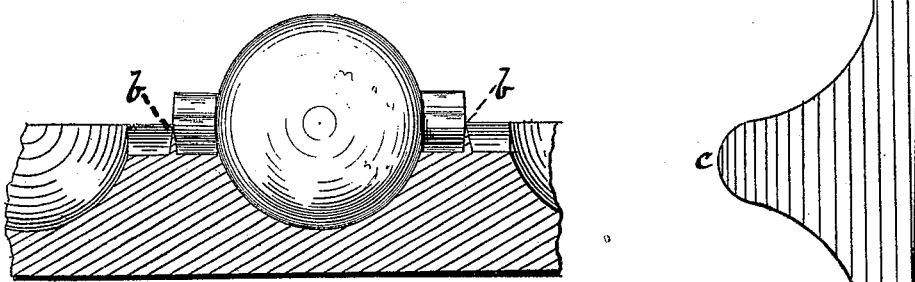

The product of the former $a$ is shown by Fig. 3, which represents three balls not entirely cut apart. The smallest one is of egg-shape, to show that glass eggs may be made in this way.

It will be noticed that the working cavity or face of the former (see Fig. 2) is exactly a half-circle. I prefer it thus; but it may be a smaller segment. I also prefer to have the cutters $b$ rise slightly in height as the rear end of the former is approached, because as the power to rotate the glass is from the pipe (a portion of which is shown in broken lines) it is desirable to finish and cut off the rear ball first, and so on until they are all finished. This effect may be secured by placing the former in a slightly slanting or inclined position, the rear ends being raised somewhat.

Fig. 2 shows a hinged cutter or knife, $c$, which, when used, is designed to shut down on the glass and press it upon the cutter $b$, and thereby facilitate and hasten the severance of the glass. This cutter may or may not be used, at pleasure, and may have either a sharp or blunt edge. Other forms of cutter may be used, such as diamond points or revolving cutters, instead of the cutters $b$ and $c$.

I have been describing the manufacture of solid balls. To make a hollow ball, I first form a cylinder of glass of the required length, and then rotate it in the former $a$, as described. The rotation on the cutters forces the sides in upon each other, sealing up the ends, and then severs the balls. If there is too much air in the cylinder, the excess is permitted to escape through the pipe as the rolling progresses. If too little to form the size of ball required, it may be expanded sufficiently by blowing before the communication between the balls is closed.

Figure 5:
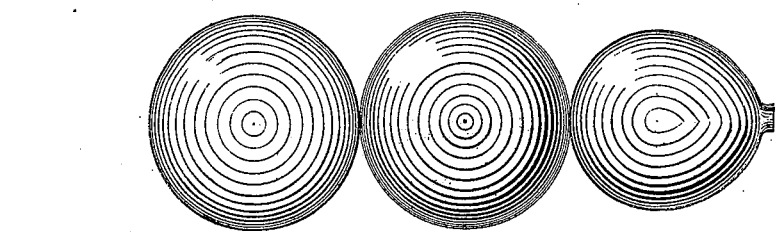

Figs. 4 and 5 illustrate the manufacture of balls with grooves and journals. Many other forms of articles of this description may be made in this way. I here remark that the manufacture of glass balls, which are now coming into extensive use for caster-rollers and other purposes, has heretofore been very costly and difficult, it requiring skilled labor of the highest grade. The ball was first cast in a surrounding two-part mold having a gate or opening, through which the glass was pressed. It was then removed from the mold, held by tools by the overflow which formed in the pouring-gate, reheated, and the mold-mark warmed in and obliterated by tools. Then the projection was cut off, and the rough place left thereby was ground and polished to smooth it.

The first experimental balls which were made in my machine were far more uniform in shape and perfect in finish than those which are made by the former method.

Another example of my invention is shown by Figs. 6 and 7, which are, respectively, longitudinal and cross sections of a ring-jar former. A ring-jar is a jar which has rings formed around it for ornamental purposes. It has heretofore been made either by blowing in a surrounding mold having ring-cavities in it, or by making the jar in a plain cylinder and casting the rings on it by hand. The first way was cheap and easy, but the rings were hollow and gathered dirt, which was hard to remove; and the second was slow and expensive, and lacked uniformity.

In making a ring-jar, I first make the preliminary cylinder, and then rotate it in the former $f$, and expand it by blowing gently through the pipe as it is rotated. The cutter $b$, in this case, is arranged at the front end of the former to cut off the blow-over and to finish the mouth of the jar. The cutter $c$ may also be used, and in that case it is arranged as shown. Its chief purpose is to force the glass down upon the cutter $b$, for the better performance of which it is preferably made on a slightly-different circle than the lower cutter, so that the circular opening formed by the two cutters shall be a little narrower in its vertical than in its horizontal diameter. The cutter $c$ is not designed to be closed down until the article is nearly completed. The cut made by the cutter $b$ is produced by the pressure and weight of the article upon it as it is rotated, and it makes a clean and finished edge.

It is not possible in any other machine or method that I know to get the pressure or weight of the article upon the cutter while being formed, and in this exists a vital difference between my method and those in which the cutters operate only after the article is formed. In my method the cutter progresses through the plastic glass gradually as the article is being formed, so that when it is fully formed the end has been cut off and finished. The rings on the jar are not produced by the blowing of the glass, but by the pressure of the article on the former, and they are consequently not hollow, but solid and uniform.

Fig. 8 illustrates the manufacture of bottles, which I remark do not require to be finished at the mouth by a hand-tool as in the old method.

Fig. 9 shows the manufacture of lamps, and Fig. 10 the preliminary roll of glass for that purpose, which, as the stem of the lamp is solid and the body hollow, requires to be partly solid and partly hollow. This is made by any glass-blower. This former has a movable section, $g$, for forming the cavity in the foot. To remove the article, the piece $g$ is first drawn back.

Figure 12:
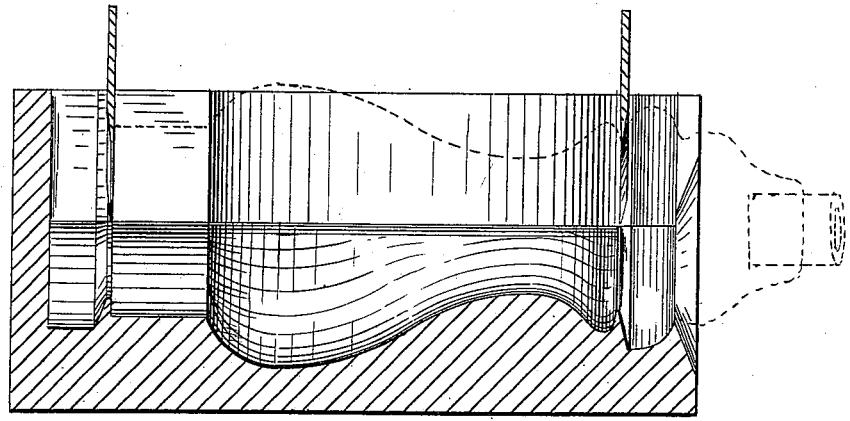
Figure 11:
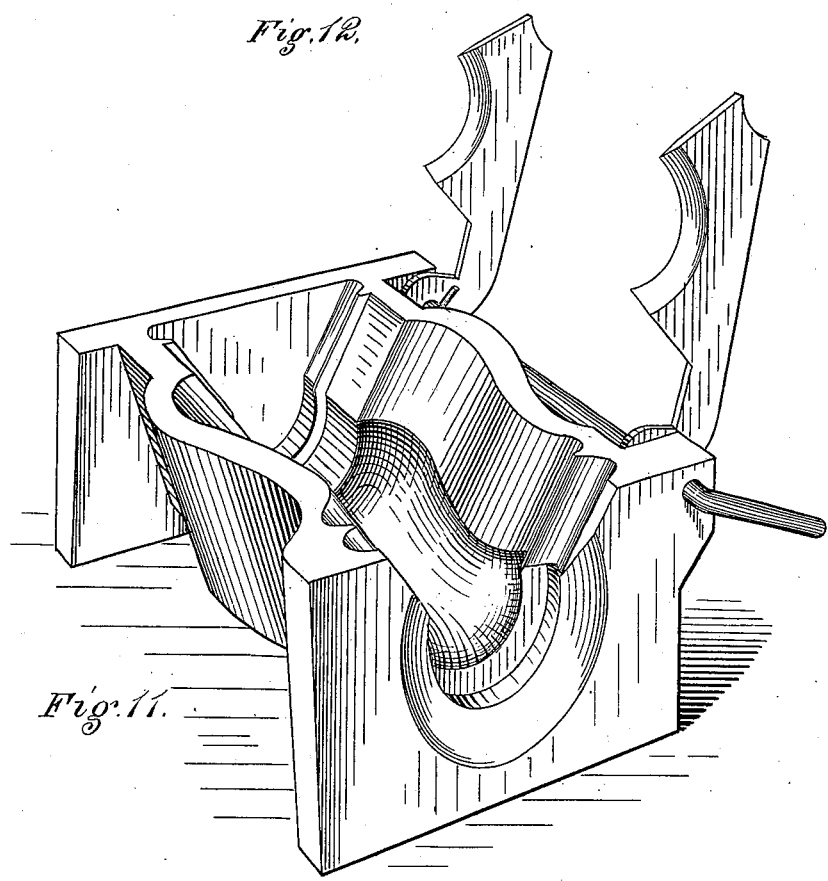

Figs. 11 and 12 show a lamp-chimney former. This is provided with cutters to cut off both ends of the chimney. The rear one, however, should be the higher, so as to sever first; or, if the knives $c$ are used, the rear one should be closed before the front one, which would produce the same effect.

Figure 13:
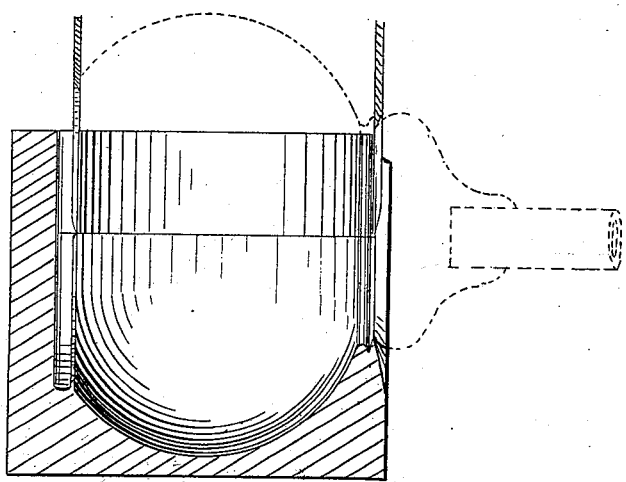

Fig. 13 shows a globe-former.

Now, in order to show the great importance of my invention in an economical point of view over old methods, I will explain the latter as regards the manufacture of lamp-chimneys as an example.

It will be remembered that Figs. 11 and 12 show my improved method of making them. A lamp-chimney is first blown in a mold by a boy, such work not requiring any particular skill. Then it is reheated by the "warming-in" "boy," and finished by skilled labor. This work is done by the "gaffer," or head man of the shop. A shop is the gang of workmen who, in their united capacity and joint duties, perform all the work necessary to make a lamp-chimney, and of these the gaffer is the most skilled and consequently the most expensive workman. After the chimney is made it requires to be either reheated or finished in the usual way, or ground at the lower end to make it fit the lamp-burner. The grinding causes a large amount of breakage, which is frequently equal to twenty per cent. of the production.

In making chimneys by my process, I require the services of a boy to make the initial cylinders and rotate them in the former, and if they are to be tempered another boy to carry the chimneys to the leer. I save, therefore, the expense of the boy who handles the mold, called the "holding-mold" boy, the "warming-in" boy, the "gaffer," or the grinder. In other words, at the present cost of manufacture, I can produce any number of lamp-chimneys at about one-third the cost of an equal number by the old method, besides saving entirely the loss by breakage by grinding, and cost of machinery, and produce a better and handsomer article. Other articles show a corresponding saving.

I prefer to lubricate the former with a little oil or bees-wax and powdered charcoal. It imparts a better finish to the article. As the former is open, no air can be confined by the glass and mar its surface. In fact, the former might be provided with holes, openings, or slots *ad libitum* without detracting from its utility, the rotation of the article causing the former to be substantially solid, so that it might be made of ribs or edges of suitable contour, if desired.

By "horizontal position" I mean a position in which the longitudinal axis of the mold shall be more nearly horizontal than vertical.

Many articles other than those enumerated may be made in this way, and all articles so made will combine the perfection of finish of hand-made ware with the uniformity and cheapness of molded ware.

Figure 14:
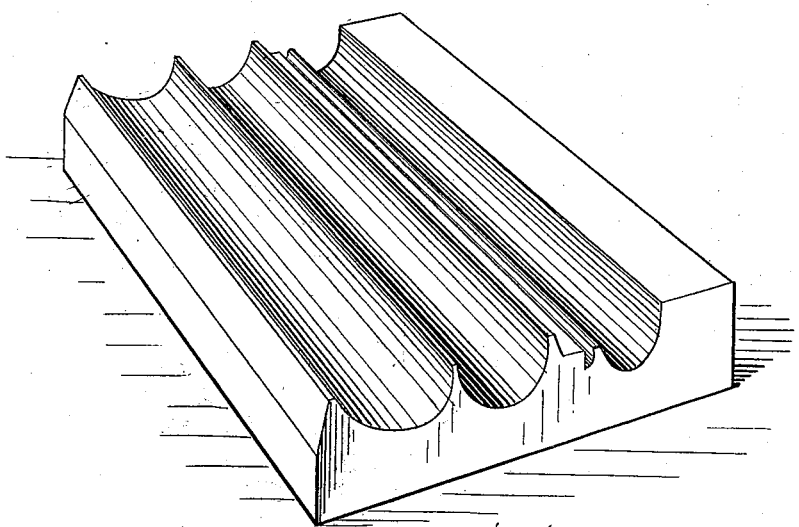

Fig. 14 shows a former with transverse grooves, in which my invention may be practiced, because while there are no sides to the grooves, yet the rotation of the glass shapes it upon the bottom of the groove, which, therefore constitutes substantially a horizontal segmental former.

Figure 15:
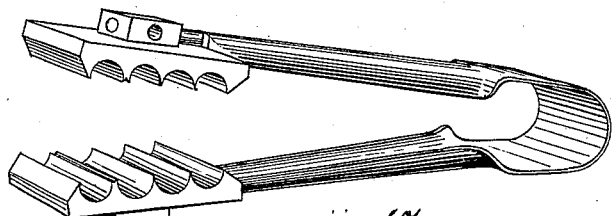

The grooves shown in Fig. 14 are designed to form an egg, a ball, and a door-knob. The same is also true of Fig. 15, which represents a hand-tool of similar construction. This tool can be used only by rotating the glass on the groove, as described hereinbefore, and is a substantial embodiment of my invention. I do not, however, think that Figs. 14 and 15 show the best forms for practical purposes.

Among other advantages of my invention is the fact that the article is under the inspection of the blower during the entire time of its formation, which is not the case with articles rotated in a mold, and enables him to work with much greater precision.

Furthermore, my invention obviates the necessity of finishing in an oil-flame glory-hole furnace in order to obtain a fine finish. This is a matter of great expense, while the exceptionably perfect finish that I obtain is only an incident of my process.

In this invention the weight of the article supplies the molding-pressure, the rotation of the article preserving its form and directing the pressure.

There are a number of articles which can be made in pairs or triplets in the same way as the balls are formed in Figs. 1 and 2.

What I claim as my invention, and desire to secure by Letters Patent, is—

1. The method hereinbefore described of making glass articles which are round in cross-section, consisting in rotating the plastic glass under its own weight in a segmental former.

2. The method hereinbefore described of making hollow glass articles which are round in cross-section, consisting of simultaneously blowing and rotating the plastic glass under its own weight in a segmental former.

3. The method hereinbefore described of making solid or hollow glass articles which are round in cross-section, consisting of rotating the plastic glass in a segmental former to shape the article, and upon a cutter or cutters to sever and finish the end or ends of the same.

4. A glass-former for forming glass articles, substantially as hereinbefore described, the working face of which is a half-circle or a segment thereof in cross-section, substantially as set forth.

5. An open mold or former for forming glass articles by rotation therein, substantially as and for the purposes described.

6. A segmental circular former having a groove or grooves, in which to form the article or articles by rotation therein, and one or more cutters, to sever and finish the same at one or both ends, substantially as described.

In testimony whereof I, the said THOMAS B. ATTERBURY, have hereunto set my hand.

THOS. B. ATTERBURY.

Witnesses:
  T. B. KERR,
  D. P. COWL.